(12) United States Patent
Talley

(10) Patent No.: US 7,958,939 B2
(45) Date of Patent: Jun. 14, 2011

(54) COMPOSITION AND METHOD FOR PRODUCING A PUMPABLE HYDROCARBON HYDRATE SLURRY AT HIGH WATER-CUT

(75) Inventor: Larry D. Talley, Friendswood, TX (US)

(73) Assignee: ExxonMobil Upstream Research Co., Houston, TX (US)

( * ) Notice: Subject to any disclaimer, the term of this patent is extended or adjusted under 35 U.S.C. 154(b) by 90 days.

(21) Appl. No.: 12/162,479

(22) PCT Filed: Feb. 13, 2007

(86) PCT No.: PCT/US2007/003690
§ 371 (c)(1),
(2), (4) Date: Nov. 7, 2008

(87) PCT Pub. No.: WO2007/111789
PCT Pub. Date: Oct. 4, 2007

(65) Prior Publication Data
US 2009/0221451 A1 Sep. 3, 2009

Related U.S. Application Data

(60) Provisional application No. 60/785,949, filed on Mar. 24, 2006.

(51) Int. Cl.
*E21B 37/06* (2006.01)
*E21B 43/00* (2006.01)
*C09K 8/52* (2006.01)

(52) U.S. Cl. ......... 166/369; 137/13; 166/244.1; 507/90; 585/15; 585/950

(58) Field of Classification Search .................. None
See application file for complete search history.

(56) References Cited

U.S. PATENT DOCUMENTS

| | | | |
|---|---|---|---|
| 4,915,176 | A | 4/1990 | Sugier et al. |
| 4,973,775 | A | 11/1990 | Sugier et al. |
| 5,244,878 | A | 9/1993 | Sugier et al. |
| 5,426,258 | A | 6/1995 | Thomas et al. |
| 5,434,323 | A | 7/1995 | Durand et al. |
| 5,491,269 | A | 2/1996 | Colle et al. |
| 5,536,893 | A | 7/1996 | Gudmundsson |

(Continued)

FOREIGN PATENT DOCUMENTS

CA 2036084 8/1991

(Continued)

OTHER PUBLICATIONS

Erik M. Freer et al., "Methane hydrate film growth kinetics", Fluid Phase Equilibria, 2001, pp. 65-75, vol. 185, Elsevier Science B.V.

(Continued)

*Primary Examiner* — George Suchfield

(57) ABSTRACT

Embodiments of the invention relate to a process for providing a pumpable hydrate slurry in a hydrocarbon pipeline fluid mixture having a water-cut greater than about 50 volume percent. In one or more embodiments the process comprises treating the fluid mixture with an anti-agglomerant and adding water to the fluid mixture in an amount sufficient to lower the gas-water ratio sufficiently to achieve a pumpable hydrate slurry. Also disclosed are methods for producing hydrocarbons utilizing a process for providing a pumpable hydrate slurry in a hydrocarbon pipeline fluid mixture having a water-cut greater than about 50 volume percent.

13 Claims, 2 Drawing Sheets

U.S. PATENT DOCUMENTS

| | | |
|---|---|---|
| 5,600,044 A | 2/1997 | Colle et al. |
| 5,744,665 A | 4/1998 | Costello et al. |
| 5,816,280 A | 10/1998 | Rojey et al. |
| 5,817,898 A | 10/1998 | Delion et al. |
| 5,841,010 A | 11/1998 | Rabeony et al. |
| 5,877,361 A | 3/1999 | Rojey et al. |
| 5,879,561 A | 3/1999 | Klomp et al. |
| 5,900,516 A | 5/1999 | Talley et al. |
| 5,936,040 A | 8/1999 | Costello et al. |
| 5,941,096 A | 8/1999 | Gudmundsson |
| 5,958,844 A | 9/1999 | Sinquin et al. |
| 6,015,929 A | 1/2000 | Rabeony et al. |
| 6,028,233 A | 2/2000 | Colle et al. |
| 6,102,986 A | 8/2000 | Klug |
| 6,107,531 A | 8/2000 | Colle et al. |
| 6,177,497 B1 | 1/2001 | Klug et al. |
| 6,194,622 B1 | 2/2001 | Peiffer et al. |
| 6,307,191 B1 | 10/2001 | Waycuilis |
| 6,350,928 B1 | 2/2002 | Waycuilis et al. |
| 6,444,852 B1 | 9/2002 | Milburn et al. |
| 6,566,309 B1 | 5/2003 | Klug et al. |
| 6,656,366 B1 | 12/2003 | Fung et al. |
| 6,703,534 B2 | 3/2004 | Waycuilis et al. |
| 6,774,276 B1 | 8/2004 | Lund et al. |
| 6,867,262 B1 | 3/2005 | Angel et al. |
| 7,008,466 B2 | 3/2006 | Collins |
| 7,261,810 B2 | 8/2007 | Argo et al. |
| 7,541,009 B2 | 6/2009 | Takao et al. .................. 422/198 |
| 7,585,816 B2 * | 9/2009 | Colle et al. ...................... 507/90 |
| 2004/0129609 A1 | 7/2004 | Argo et al. |
| 2004/0159041 A1 | 8/2004 | Dalhmann et al. |
| 2004/0176650 A1 | 9/2004 | Lund et al. |
| 2005/0081714 A1 | 4/2005 | Panchalingam et al. |
| 2005/0137432 A1 | 6/2005 | Matthews et al. |
| 2006/0106265 A1 | 5/2006 | Rivers et al. |
| 2006/0175062 A1 | 8/2006 | Benson |
| 2006/0205603 A1 | 9/2006 | Colle et al. |
| 2006/0272805 A1 | 12/2006 | O'Malley et al. |
| 2008/0101999 A1 | 5/2008 | Balczewski |
| 2008/0102000 A1 | 5/2008 | Balczewski |
| 2008/0103343 A1 | 5/2008 | Balczewski |
| 2009/0078406 A1 * | 3/2009 | Talley et al. ............... 166/177.3 |
| 2009/0124520 A1 | 5/2009 | Tohidi ............................ 507/90 |

FOREIGN PATENT DOCUMENTS

| | | |
|---|---|---|
| EP | 0 526 929 B1 | 1/1996 |
| EP | 1957856 | 3/2009 |
| WO | WO 93/25798 A1 | 12/1993 |
| WO | WO 95/17579 A1 | 6/1995 |
| WO | WO 96/34177 A1 | 10/1996 |
| WO | WO 99/13197 A1 | 3/1999 |
| WO | WO 2005/026291 A1 | 3/2005 |
| WO | WO 2005/058450 A2 | 6/2005 |
| WO | WO 2006/027609 A1 | 3/2006 |
| WO | WO 2006/048666 A2 | 5/2006 |
| WO | WO 2006/052455 A2 | 5/2006 |
| WO | WO 2006/068929 A1 | 6/2006 |

OTHER PUBLICATIONS

T. Johnson et al., "Looking for Hydrates in Places Other Than Flowlines and Pipelines", OTC17345, 2005 Offshore Technology Conference, May 2-5, 2005, 4 pages, Houston, TX.

Ju Dong Lee et al., "Methane-ethane and methane-propane hydrate formation and decomposition on water droplets", Chemical Engineering Science, 2005, pp. 4203-4212, vol. 60, Elsevier Science B.V.

M. Mork et al., "Rate of Hydrate Formation in Subsea Pipelines, Correlation Based on Reactor Experiments", 12$^{th}$ International Oil Field Chemistry Symposium, Apr. 1-4, 2001, 11 pages, Geilo Norway.

Larry Talley et al., "Comparison of Laboratory Results on Hydrate Induction Rates in a THF Rig, High-Pressure Rocking Cell, Miniloop, and Large Flowloop", *Gas Hydrates, Challenges for the Future: Annals of the New York Academy of Sciences*, Oct. 2001, pp. 314-321, vol. 912, New York, NY.

Yingming Xie et al., "Gas hydrate fast nucleation from melting ice and quiescent growth along vertical heat transfer tube", Science in China, Series B, 2005, pp. 75-82, vol. 48/1.

European Search Report No. 113909, dated Sep. 8, 2006, 3 pages.

* cited by examiner

COMPOSITION AND METHOD FOR PRODUCING A PUMPABLE HYDROCARBON HYDRATE SLURRY AT HIGH WATER-CUT

CROSS REFERENCE TO RELATED APPLICATIONS

This application is the National Stage of International Application No. PCT/US07/03690, filed 13 Feb. 2007, which claims the benefit of U.S. Provisional Application No. 60/785,949, filed 24 Mar. 2006.

BACKGROUND OF THE INVENTION

1. Field of the Invention

The invention relates to the transportation of petroleum crude oil fluids.

The invention particularly relates to the pipeline transportation of petroleum crude oil containing one or more phases comprising liquid and gaseous hydrocarbons, water and solid phases including wax, ice and hydrocarbon hydrate slurries. The invention is especially related to a method, apparatus and composition for enhancing the pumpability of petroleum crude oil fluids having a high water volume rich in hydrocarbon hydrates.

2. Discussion of Background Information

This section is intended to introduce various aspects of the art, which may be associated with exemplary embodiments of the present invention. This discussion is believed to assist in providing a framework to facilitate a better understanding of particular aspects of the present invention. Accordingly, it should be understood that this section should be read in this light, and not necessarily as admissions of prior art.

Oil and gas production facilities handle at least three phases including liquid hydrocarbon, gas and liquid water phases. Many facilities have to handle multiphase fluids that include additional solid phases such as wax, ice and hydrates. Hydrates can form rapidly in pipelines, causing large drifts of solid hydrate that reduce the flow of gas and liquids. The hydrates can be plowed up by the flowing liquids, causing the solids to completely block the pipeline with respect to liquid and gas flow. Once hydrate blockages occur, remediation options may include depressurization, hot liquid jetting via coiled tubing, bullheading thermodynamic inhibitors into the pipeline, electrical or natural heating or pipeline replacement. All of these remedies are economically costly and operationally hazardous.

There are many different solutions currently in use or known to prevent hydrate formation or manage hydrate pumpability. These include pipeline insulation, electrical heating, thermodynamic inhibitor (methanol and glycol) injection, kinetic inhibitor injection, anti-agglomerant chemical injection and hydrate slurry modification for cold flow. The term "inhibitors" refers to chemicals that prevent or retard hydrate formation while the term "anti-agglomerants" refers to surface active agents that restrict coalescence of formed hydrocarbon hydrates, promote the pumpability of formed hydrates and retard pipeline plugging by hydrocarbon hydrates. It is known in the art that the colder the pipeline fluid temperature, the more costly per barrel of hydrocarbon are the insulation, heating, thermodynamic and kinetic inhibitor treatment methods for hydrate remediation. It is known as well that the higher the percentage of water in the pipeline fluids, the higher the costs per barrel of hydrocarbon are for these same methods. Thus, colder fluid temperatures, particularly those below the temperature at which hydrates dissociate, favor anti-agglomerants and cold flow methods to avoid blockages in the pipeline. However, the effectiveness of both of these methods has been limited to a maximum of about 50 volume percent water to total liquids in the pipeline fluids. Above this maximum limit, the hydrate solids are not pumpable.

U.S. Patent publication number 2005/0137432 describes a method for inhibiting hydrate formation blockage in a flow line used to transport hydrocarbon containing fluids. Water is added to a hydrocarbon containing fluid to produce a water cut enhanced hydrocarbon containing fluid. Salt may be added to the hydrocarbon containing fluids as well. Hydrate formation blockage is said to be inhibited from forming within the flow line by the addition of the water and/or the salt, and that potentially toxic anti-agglomerate low dose hydrate inhibitors ("LDHI") chemicals can be eliminated from offshore applications. The application of the disclosed method to heavy oils (approximately 20° API (American Petroleum Institute gravity)) is discussed. However, heavy oils typically have relatively low water-oil interfacial tensions and often contain significant quantities of polar compounds that can act as anti-agglomerants, with the result that hydrates do not plug or form blockages even in the absence of added anti-agglomerant. For lighter oils not containing such polar compounds, hydrate plugs or blockages may still occur.

Anti-agglomerant ("AA") technology used today is in need of improvement in certain respects. While products for making pumpable hydrate slurries in fill wellstream flowlines are commercially available, current products are ineffective at water cuts above 50-60 volume percent water when used as directed. Most current products are ineffective at water cuts above 30-35 volume percent. The reason for the ineffectiveness at high water cut is believed to be that the anti-agglomerants cannot disperse water in oil as they do at lower water-cut. There is a phase inversion upon going from oil-water-anti-agglomerant at low water cut to high water cut. The hydrates formed in water-in-oil dispersions at low water cut are pumpable and non-plugging. The hydrates formed in oil-in-water dispersions at high water-cut are plugging as a rule. Hydrate slurries resulting from normal application of anti-agglomerants as known in the art at high water-cuts are too viscous to flow in a pipeline. The high viscosity occurs when the solid hydrate volume exceeds the liquid oil volume. Thus, there is a need for improved compositions, apparatus and methods for producing pumpable hydrocarbon hydrate pipeline slurries at high water cut. There is also a need for such improved compositions, apparatus and methods that are effective with lighter oils (greater than approximately 20° API).

SUMMARY OF THE INVENTION

In one or more embodiments of the present invention at least one method and at least one composition are provided, which produce a pipeline pumpable hydrate slurry in high water-cut or water volume pipeline fluid systems containing between approximately fifty to about ninety two percent water volume (about 50 volume percent (vol. %) to about 92 vol. %). A pumpable hydrate slurry may be formed when the volume of solid hydrate is limited to a value less than the combined volume of oil and unhydrated water in the pipeline system. Additionally, a pumpable hydrocarbon hydrate slurry may be achieved by limiting the volume of the solid hydrate in the pipeline system to a value less than the volume of liquids in the system, particularly oil and unhydrated water. Thus, in one or more embodiments, the present invention relates to a method for achieving a pumpable hydrate slurry at high water-cut by restricting the degree of conversion of the aqueous phase in the system to hydrocarbon hydrate. In accordance with the present invention, pumpable hydrate slurries can be produced in systems that contain up to about 92 volume percent of water to total liquid volume.

In one embodiment of the present invention, a process for providing a pumpable hydrate slurry in a hydrocarbon fluid mixture having a water-cut greater than about 50 volume percent is disclosed. The process comprises treating the hydrocarbon fluid mixture with an anti-agglomerant; and adding water to the hydrocarbon fluid mixture in an amount sufficient to lower the gas-water ratio sufficiently to achieve a pumpable hydrate slurry. The process may further include adding thermodynamic inhibitors of hydrate formation, which may be methanol or glycol. Further, the anti-agglomerant may be a chemical selected from the group consisting of diethanolamines, dioctylsulphosuccinates, sorbitans, ethoxylated polyols, ethoxylated fatty acids, ethoxylated amines, alkylarylsulfonates, alkylglucosides, tetrabutlyammonium bromide, tetrapentylammonium bromide, quaternary ammonium salts having two or more n-butyl, n-pentyl, and isopentyl groups with at least one or two groups consisting of a long hydrophobic hydrocarbon chain comprising 8-18 carbon atoms, diesters of dibutyldiethanolammonium halides and two moles of coconut fatty acids with 12-14 carbon atoms, bis(coco alkyl)dibutyl ammonium chloride, bis(coco alkyl) dipentyl ammonium chloride, bis(coco alkyl)di butyl ammonium bromide, bis(coco alkyl)dipentyl ammonium bromide, and mixtures thereof.

In another embodiment of the present invention a high water-cut pipeline pumpable crude oil fluid composition rich in hydrocarbon hydrate slurry is disclosed. The composition comprising a hydrocarbon hydrate anti-agglomerant and said pumpable crude oil and an unhydrated water in a combined volume greater than the volume of said hydrocarbon hydrate slurry. The high water-cut may comprise from about 50 volume percent to about 92 volume percent water.

In a third embodiment of the present invention, a method of producing a hydrocarbon containing fluid is disclosed. The method comprises extracting a hydrocarbon containing fluid comprising hydrate-forming gases from a wellbore, said hydrocarbon containing fluid having at least an oil phase and a water phase and also having a water cut greater than about 50 volume percent; adding an anti-agglomerant to said water phase; adding water to said hydrocarbon containing fluid in an amount sufficient to lower the gas-water ratio of said hydrocarbon containing fluid sufficient to achieve a pumpable hydrocarbon hydrate slurry; and transporting said hydrocarbon containing fluid through a pipeline to a remote location for loading or further processing.

In a fourth embodiment of the present invention, a method of producing hydrocarbons is provided. The method comprising producing a wellstream comprising hydrocarbons and water from a well, said wellstream having a water cut of about 50 volume percent or greater; adding an anti-agglomerant to said wellstream; adding water to said wellstream in an amount sufficient to provide a wellstream comprising a pumpable hydrate slurry and hydrocarbons; transporting said wellstream comprising said pumpable hydrate slurry and hydrocarbons through a pipeline; and recovering said hydrocarbons.

In a fifth embodiment of the present invention, a method of producing hydrocarbons is disclosed. The method comprising producing a wellstream comprising hydrocarbons and water from a well, said wellstream having a water cut of about 50 volume percent or greater; adding an anti-agglomerant to said wellstream; reducing the gas content of said wellstream by an amount sufficient to provide a wellstream comprising a pumpable hydrate slurry and hydrocarbons; transporting said wellstream comprising a pumpable hydrate slurry and hydrocarbons through a pipeline; and recovering said hydrocarbons.

In a sixth embodiment of the present invention, a method for inhibiting hydrate formation blockage in a pipeline used to transport hydrocarbon containing fluids is disclosed. The method comprises producing a wellstream comprising hydrocarbon containing fluids and water from a well, said wellstream having a water cut of about 50 volume percent or greater; adding an anti-agglomerant to said wellstream; adding water to said wellstream in an amount sufficient to provide a wellstream comprising a pumpable hydrate slurry and hydrocarbon containing fluids; and transporting said wellstream comprising said a pumpable hydrate slurry and said hydrocarbons through said pipeline.

In a seventh embodiment of the present invention, a process for providing a pumpable hydrate slurry in a hydrocarbon fluid mixture having a water-cut greater than about 30 volume percent is disclosed. The process comprises treating the fluid mixture with an anti-agglomerant that is ineffective at a water-cut above about 30 volume percent; and adding water to the fluid mixture in an amount sufficient to lower the gas-water ratio sufficiently to achieve a pumpable hydrate slurry.

In an eighth embodiment of the present invention, a process for providing a pumpable hydrate slurry in a hydrocarbon fluid mixture having a water-cut greater than a predetermined percentage is disclosed. The process comprises treating the fluid mixture with an anti-agglomerant that is ineffective at a water-cut above said predetermined percentage; and adding water to the fluid mixture in an amount sufficient to lower the gas-water ratio sufficiently to achieve a pumpable hydrate slurry.

In a ninth embodiment of the present invention a method of producing hydrocarbons is disclosed. The method comprises producing a wellstream comprising hydrocarbons and water from a well, said wellstream having a water cut greater than a predetermined percentage; adding an anti-agglomerant that is ineffective at a water-cut above said predetermined percentage to said wellstream; adding water to said wellstream in an amount sufficient to provide a wellstream comprising a pumpable hydrate slurry and hydrocarbons; transporting said wellstream comprising said a pumpable hydrate slurry and hydrocarbons through a pipeline; and recovering said hydrocarbons.

In one or more embodiments, aspects of the method of the invention are carried out through a select combination of the following:

A. treating a wellstream fluid or a pipeline water phase with an anti-agglomerant ("AA") that is effective for conventional hydrate pumping enhancement at water-cuts below fifty volume percent water; and B. reducing the total volume of hydrate formed by applying one or more of the following:

B1. reducing the gas fraction of the system such that total hydrate volume is limited;

B2. increasing the water fraction of the system such that total hydrate volume is limited; and/or B3. increasing the concentration of thermodynamic inhibitors in the aqueous phase during hydrate slurry formation. The anti-agglomerants that may be used include commercially available anti-agglomerants such as, for example, Baker Petrolite RE-4394 and Nalco VX-7539. Such anti-agglomerants are used at the vendor-recommended dose rate for the composition, pressure and temperature of the application at low water-cut.

BRIEF DESCRIPTION OF THE FIGURES

The foregoing and other advantages of the present invention may become apparent upon reviewing the following detailed description and drawings of non-limiting examples of embodiments in which.

DETAILED DESCRIPTION OF THE PRESENT INVENTION

Figure 1:
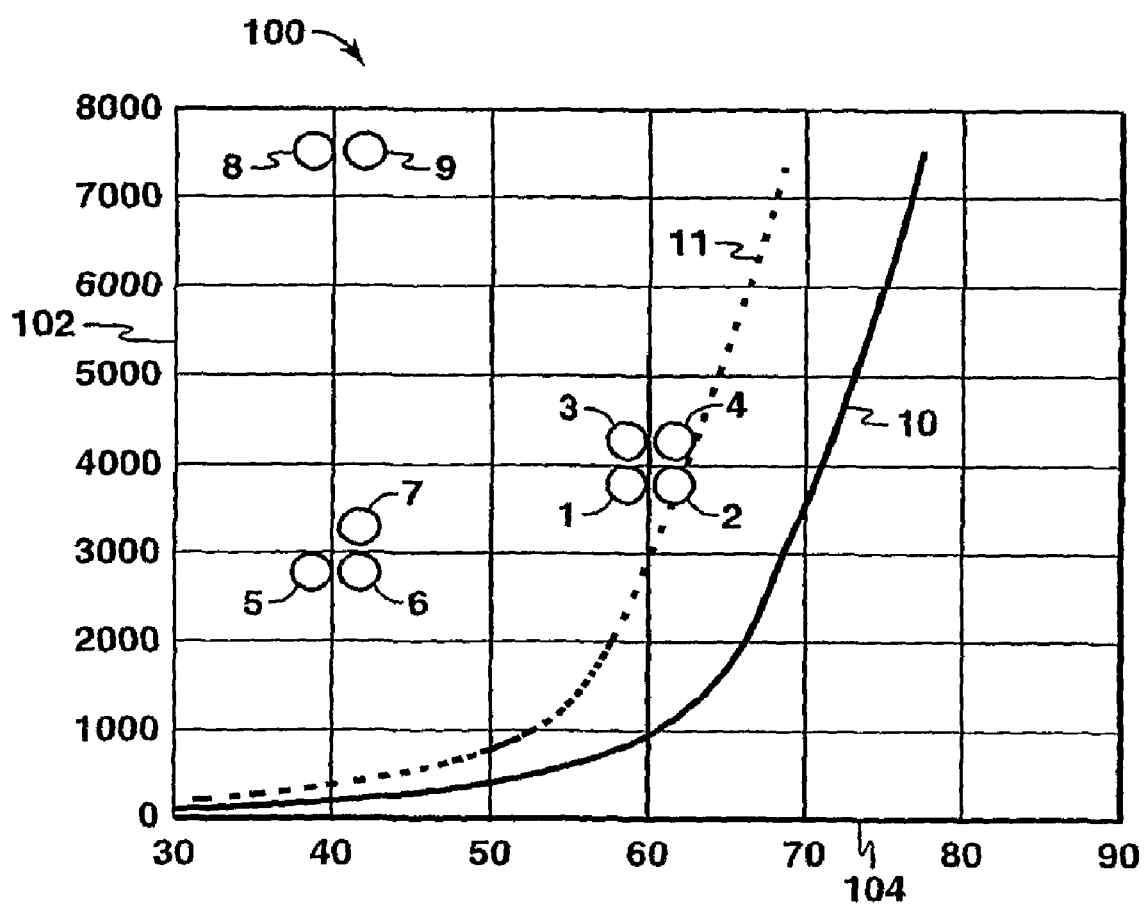
FIG. 1 is an illustration of an exemplary graph showing the hydrate curves of simulated oil fields rich in brine under varying conditions of pressure and temperature, absent hydrate pumping enhancement additives.

In the following detailed description section, the specific embodiments of the present invention are described in connection with preferred embodiments. However, to the extent that the following description is specific to a particular embodiment or a particular use of the present invention, this is intended to be for exemplary purposes only and simply provides a description of the exemplary embodiments. Accordingly, the invention is not limited to the specific embodiments described below, but rather, it includes all alternatives, modifications, and equivalents falling within the true spirit and scope of the appended claims.

In some embodiments of the present invention hydrocarbon hydrates known to agglomerate and block the flow of crude oil pipeline fluids containing about 50 volume percent or more of water are rendered pumpable. It has been demonstrated that, through at least one process of the invention, pumpable hydrocarbon hydrate slurries can be accepted in systems that contain up to about 92 vol. % water in total liquids without blocking the pipeline flow of the crude oil liquids.

Certain embodiments of the process of the invention for achieving hydrate pumpability include the following:

providing a wellstream fluid comprising hydrocarbons at a water cut of about 50 volume percent water or greater, and A. treating the wellstream fluid with an anti-agglomerant ("AA") suitable for conventional hydrate pumping enhancement at water-cuts below fifty volume percent water; and B. adjusting the gas-volume ratio of the wellstream fluid to achieve a pumpable hydrate slurry by one or more of the following methods:

B1. reducing the gas fraction of the wellstream fluid;

B2. adding water to the wellstream fluid to increasing the water fraction of the system; and B3. increasing the concentration of thermodynamic inhibitors in the aqueous phase during hydrate slurry formation.

As used herein, including in the appended claims, the term "water-cut" (also referred to as "watercut" or "water cut") refers to the volume percentage of the liquid phase in a wellstream or other hydrocarbon fluid mixture (or hydrocarbon containing fluid) that is water. For example, in a wellstream having a gas phase and a liquid phase each constituting about 50 volume percent (%) of the total wellstream volume, if the liquid phase is about 50 volume % water then the wellstream has a water cut that is about 50 volume %. Similarly, in a wellstream having a gas phase and a liquid phase constituting about 10 and about 90 volume %, respectively, of the total wellstream volume, if the liquid phase is about 50 volume % water, then the wellstream has a water cut that is about 50 volume %. It will also be understood that references to "water" herein are intended to encompass aqueous solutions such as brine, seawater, and the like, but does not include hydrates.

The hydrocarbons in the wellstream fluids may include crude oil or other hydrocarbon-containing oils or gases, including natural gas, or mixtures of any of the foregoing. In one or more embodiments, the anti-agglomerate ("AA") is a water soluble AA. In any of the embodiments disclosed herein, any one, or any combination of, B1, B2, and B3 may be performed. For example, B1 may be performed alone, or B1 and B2 both may be performed, or B1, B2, and B3 may all three be performed, or B1 and B3 may be performed, or B2 and B3 may be performed.

A suitable anti-agglomerant injection rate may be calculated based on the vendor-recommended AA concentration in water and the measured water production rate.

In carrying out certain embodiments of the invention, items B1 and B2 may be performed as follows: The total gas fraction, i.e., methane/ethane/propane/butane rate, is calculated from the known gas rate in Standard Cubic Feet per day (scfd) and the gas composition in mole percent. The total water rate is calculated in barrels per day (bpd) from the predicted or measured produced water rate. From this information, the gas-water ratio of hydrate gases (methane, ethane, propane, etc) to water can be calculated. This value is compared to the region below lines of the type shown as lines 208 and 308 in FIGS. 2 and 3, respectively, which are discussed in more detail below. If the field value of the gas-water ratio is lower than the line, the system will be pumpable as is. If it is higher, then either (1) gas is separated from the fluids in the pipe or (2) more water is added to the fluids to make the gas-water ratio low enough to promote a pumpable hydrate slurry.

It will be understood that the water that is added in accordance with one or more embodiments of the invention can be seawater or brine or other aqueous solutions and/or slurries of water and minerals or salts. In one or more embodiments about 3.5% weight percent brine or about 12 weight percent brine may be added.

The manner of performing B3 may be an active or a passive procedure. For aqueous phases that contain high concentrations of salt, as hydrates form, the residual aqueous phase becomes more concentrated in the salt. At some point, the salt in the aqueous phase thermodynamically inhibits further formation of more hydrates. This is a passive procedure for limiting water conversion. The same result could be accomplished by actively adding other thermodynamic inhibitors to the aqueous phase, such as methanol, glycol or combinations thereof.

While not wishing to be bound by theory, it is believed that at water cuts below about 50 volume percent, typical AA's function by diffusing to the interface formed by water droplets in the oil where the AA's are incorporated into and form part of some of the hydrates as they are formed at the oil-water interface. The incorporated AA's contain large, lipophilic groups which extend from the surface of the formed hydrate particle and cause hydrate particles that have incorporated the AA to become coated with oil, which in turn hinders direct hydrate-to-hydrate contact, thereby impeding agglomeration. Competing with the formation of the AA-containing hydrates is the formation of ordinary hydrates, i.e., hydrates into which no AA has been incorporated (AA-free hydrates). At higher water cuts, i.e., about 50 volume percent or above, it is believed that the rates of these competing reactions change such that the formation rate of AA-free hydrates is increased relative to the formation rate of AA-containing hydrates. Thus, the fraction of non-agglomerating AA-containing hydrates is reduced to an ineffective level. In addition, at higher water cuts the volume of hydrates formed will be in excess of the maximum volume of hydrate solids that can that be tolerated in a pumpable slurry. Generally, hydrate slurries having greater than about 60 volume percent hydrate solids are not pumpable. At water cuts above about 50 volume percent, however, the gas-water ratio may be adjusted so as to increase the relative rate of formation of AA-containing hydrates, and hence to regain the effectiveness of the AA, and to also limit the overall volume of hydrates formed so as to be pumpable. As discussed above, adjustment of the gas-water ratio can be achieved in one or more embodiments of the invention by adding water to the wellstream fluids or by removing gas from the wellstream fluid. In one or more embodiments, the gas-water ratio is adjusted by adding seawater, which is readily available in offshore environments.

Thus, in carrying out one or more embodiments of the invention, a wellstream fluid comprising hydrocarbons having a water cut of about 50 volume percent or greater is provided; an anti-agglomerant is added to the wellstream fluid; and water is added to the wellstream fluid in an amount sufficient to result in a pumpable hydrate slurry. As noted above, some AA's are not effective above about 30 volume percent water cut. There, in one or more alternative embodiments, the invention is any of the other embodiments described herein in which a wellstream, hydrocarbon fluid mixture, or hydrocarbon containing fluid having a water-cut above about 30 volume percent is used in place of a wellstream, hydrocarbon fluid mixture, or hydrocarbon containing fluid having a water-cut above about 50 volume percent. In a specific such embodiment, a wellstream fluid comprising hydrocarbons having a water cut of about 30 volume percent or greater is provided; an anti-agglomerant is added to the wellstream fluid; and water is added to the wellstream fluid in an amount sufficient to result in a pumpable hydrate slurry. In another embodiment, the invention provides a process for providing a pumpable hydrate slurry in a hydrocarbon fluid mixture having a water-cut greater than about 30 volume percent, said process comprising: treating the fluid mixture with an anti-agglomerant that is ineffective at a water-cut above about 30 volume percent; and adding water to the fluid mixture in an amount sufficient to lower the gas-water ratio sufficiently to achieve a pumpable hydrate slurry. In yet another embodiment, the invention provides a process for providing a pumpable hydrate slurry in a hydrocarbon fluid mixture having a water-cut greater than a predetermined percentage, said process comprising: treating the fluid mixture with an anti-agglomerant that is ineffective at a water-cut above said predetermined percentage; and adding water to the fluid mixture in an amount sufficient to lower the gas-water ratio sufficiently to achieve a pumpable hydrate slurry.

Figure 2:
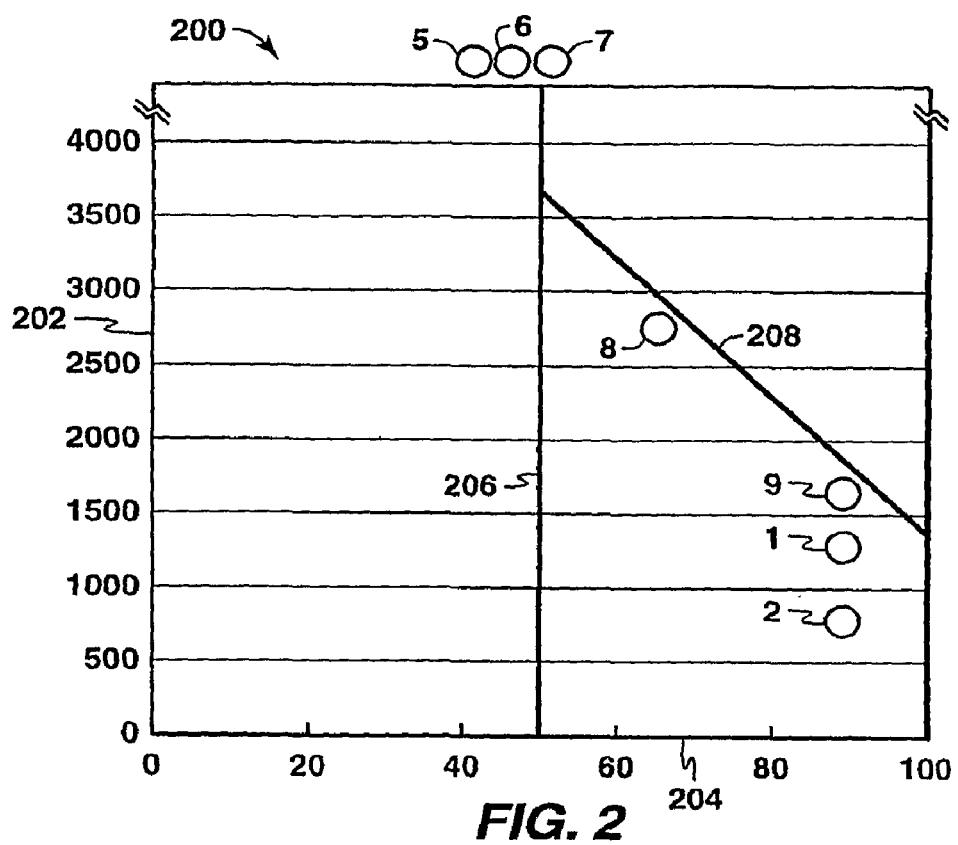
FIG. 2 is an illustration of an exemplary graph showing the preferred operating gas-water ratios for a simulated crude oil containing a first hydrate pumping enhancement anti-agglomerant additive.

The amount of water added to provide a pumpable hydrate slurry is a function of the particular AA used, the particular wellstream fluid, the specific water cut volume % and the gas-water ratio. The amount of water is determined empirically for each system. It may be useful in carrying out certain embodiments of the invention to develop relationships of the type depicted by lines 208 and 308 shown in FIGS. 2 and 3, respectively. Such relationships can be generated by performing multiple experiments in the mini-loop as described herein at multiple combinations of gas-water ratio and water cut volume percentages at or above about 50 volume percent water cut. Those combinations that result in pumpable slurries are noted. Such a series of experiments is performed for each AA of interest. In FIG. 2, for example, multiple mini-loop test runs were performed using Baker Petrolite AA at various combinations of watercut volume and gas-water ratio, with the watercut selected to be within the range of about 50 volume percent to about 100 volume percent and the gas-water ratio selected to be within the range from about 0 to about 4,000 Standard Cubic Feet per barrel (scf/bbl). For each such test, it was noted whether a pumpable or non-pumpable slurry was obtained. Line 208 in FIG. 2 was then drawn by visual inspection of the data points. As discussed in more detail below, the area to the left of vertical reference line 206 is the area where the above AA achieves pumpable hydrate slurries. The area under the line 208 represents conditions that lead to pumpable hydrate slurries with this AA and this hydrocarbon system. The area above the line 208 represents conditions for which this AA and hydrocarbon system plugs when hydrates form. Data points 8, 9, and 1 and 2 are shown as exemplary points only. Points 8 and 9, corresponding to tests 8 and 9 respectively, are shown to illustrate points near the upper limit defined by line 208 in FIG. 2. Similarly, in FIG. 3, which was generated for a Nalco AA (VX-7539), line 306 represents a reference line at about 35 volume percent water cut. The pumpable slurry region is below line 308. Data points 3 and 4, corresponding to tests 3 and 4, are shown for illustrative purposes only. Test 3 resulted in a nonpumpable slurry, whereas test 4 resulted in a pumpable slurry.

As an alternative to the above approach for defining pumpable limits, the maximum usable gas-water ratio at a particular water cut can be determined by running a series of tests at the particular water cut and adjusting the gas-water ratio upward or downward to determine the maximum gas-water ratio at which a pumpable slurry is obtained. As described elsewhere herein, the gas-water ratio can be adjusted downward by adding water or by removing gas, or both.

Similarly, the maximum water cut at a particular gas-water ratio can be determined by running a series of tests at the particular gas-water ratio and adjusting the water cut upward or downward to determine the maximum water cut at which a pumpable slurry is obtained.

In one or more other embodiments, the process of the invention is carried out using AA's that are diesters of dibutyldiethanolammonium halides and two moles of coconut fatty acids with 12-14 carbon atoms, specifically bis(coco alkyl)dibutyl ammonium chloride, bis(coco alkyl)dipentyl ammonium chloride, bis(coco alkyl)dibutyl ammonium bromide, bis(coco alkyl)dipentyl ammonium bromide, or mixtures thereof, and tri-butyl octadecyl ammonium bromide or di-butyl di-octadecyl ammonium bromide anti-agglomerants (quaternary ammonium halide salts). In one or more embodiments the AA used is selected from the group consisting of bis(coco alkyl)dibutyl ammonium chloride, bis(coco alkyl)dipentyl ammonium chloride, bis(coco alkyl)dibutyl ammonium bromide, bis(coco alkyl)dipentyl ammonium bromide, tri-butyl octadecyl ammonium bromide, di-butyl di-octadecyl ammonium bromide, and mixtures thereof. In yet other embodiments the AA is a quaternary ammonium halide salt. Then, water injection in the inlet of the pipeline is adjusted, if necessary, such that the produced water and natural gas production rates have gas-water ratios less than the lab measured maximum gas-water ratio for a particular field fluid and anti-agglomerant.

According to yet other embodiments of the invention, there is provided a method of producing hydrocarbons using any of the other methods disclosed herein.

In a specific such embodiment, the invention provides a method of producing hydrocarbons, comprising: providing a well in a hydrocarbon reservoir; producing a wellstream comprising hydrocarbons and water from said well, said wellstream having a water cut of about 50 volume percent or greater; adding an anti-agglomerant to said wellstream; adding water to said wellstream in an amount sufficient to provide a wellstream comprising a pumpable hydrate slurry and hydrocarbons; transporting said wellstream comprising said pumpable hydrate slurry and hydrocarbons through a pipeline; and recovering said hydrocarbons.

In one or more embodiments the hydrocarbons are a light oil having greater than about 20° API.

The required measurements of gas-water ratios and water-cut can be carried out using an apparatus such as the mini-loop apparatus and testing procedures described in U.S. Pat. Nos. 6,107,531 and 6,028,233, and in "Comparison of Laboratory Results on Hydrate Induction Rates in a THF Rig, High-Pressure Rocking Cell, Miniloop, and Large Flowloop," Larry D. Talley et al., *Gas Hydrates*, Vol. 912 of the Annals of the New York Academy of Sciences, all of which are hereby incorporated by reference as to their teachings regarding such apparatus and testing procedures.

EXAMPLES

The experiments described in the following Tests 1-9 were performed in high-pressure mini-loops that had either (a) temperature and pressure control at variable volume or (b) temperature control at constant volume and autogenous (decreasing) pressure. The apparatus and testing procedures are more fully disclosed in the references cited above.

Synthetic mixtures of stock tank oil and a synthetic natural gas mixture were used to simulate an actual hydrocarbon system. Synthetic brines were made from sea salt and water. The stock tank oil used is known to be a plugging oil with respect to hydrocarbon hydrates. The results of the tests are summarized in Table 1. Tests 4, 5, 6, 8, and 9 exemplify combinations of gas-water ratio, water cut, and AA that are useful in embodiments of the invention.

Test 1. A fluid was introduced into a bench scale flowloop (High-Pressure Miniloop) simulating full wellstream reservoir fluids. The fluids consisted of a stock tank oil sample, a synthetic blend of natural gas components similar to Green Canyon gas and synthetic reservoir brine equivalent to seawater. The system was pressurized to 3,800 pounds per square inch gauge (psig) at 100 degrees Fahrenheit (° F.) before the experiment. The percent of the brine volume to the total liquid volume (i.e., liquid hydrocarbon volume plus brine volume) was 90 volume percent. The total liquid volume in the flowloop was 54 volume percent. No hydrate treating chemicals were added to the brine. The fluids were circulated and cooled to 60° F. in the flowloop. A non-pumpable hydrate slurry and hydrate plug resulted.

Test 2. A fluid was introduced into a bench scale flowloop (High-Pressure Miniloop) simulating fill wellstream reservoir fluids. The fluids consisted of a stock tank oil sample, a synthetic blend of natural gas components similar to Green Canyon gas and synthetic reservoir brine equivalent to seawater. The system was pressurized to 3,800 psig at 100° F. before the experiment. The percent of the brine volume to the total liquid volume (i.e., liquid hydrocarbon volume plus brine volume) was 91%. The total liquid volume in the flowloop was 66 percent. The gas-water ratio was lower than in Test 1. No hydrate treating chemicals were added to the brine. The fluids were circulated and cooled to 60° F. in the flowloop. A non-pumpable hydrate slurry and hydrate plug resulted.

Test 3. A fluid was introduced into a bench scale flowloop simulating fill wellstream reservoir fluids. The fluids consisted of a stock tank oil sample, a synthetic blend of Green Canyon natural gas components and synthetic seawater. The system was pressurized to 3,900 psig at 100° F. before the experiment. The percent of the brine volume to the total liquid volume (i.e., liquid hydrocarbon volume plus brine volume) was 92 volume percent. Anti-agglomerant (Nalco VX-7539) was added to the brine at the vendor-specified dose of 1.5 volume percent on water volume. The fluids were circulated and cooled to 60° F. in the flowloop. A non-pumpable hydrate slurry and hydrate plug resulted.

Test 4. A fluid was introduced into a bench scale flowloop simulating full wellstream reservoir fluids. The fluids consisted of a stock tank oil sample, a synthetic blend of Green Canyon natural gas components and synthetic seawater. The system was pressurized to 4,000 psig at 99° F. before the experiment. The percent of the brine volume to the total liquid volume (i.e., liquid hydrocarbon volume plus brine volume) was 92.65 volume percent. Anti-agglomerant (Nalco VX-7539) was added to the brine at the vendor-specified dose of 1.5 volume percent on water volume. The fluids were circulated and cooled to 60° F. in the flowloop. A pumpable hydrate slurry formed and no hydrate plug resulted.

Test 5. A fluid was introduced into a bench scale flowloop simulating full wellstream reservoir fluids. The fluids consisted of a stock tank oil sample, a synthetic blend of Green Canyon natural gas components and a synthetic 12 weight percent reservoir brine. The system was circulated while pressurized to 3,200 psig before the experiment. The percent of the brine volume to the total liquid volume (i.e., liquid hydrocarbon volume plus brine volume) was 38.9 volume percent. Anti-agglomerant (Baker Petrolite RE-4394) was added to the brine at the vendor-specified dose of 2.3 volume percent on water volume. The fluids were circulated and cooled to 42° F. in the flowloop. A pumpable hydrate slurry resulted.

Test 6. A fluid was introduced into a bench scale flowloop simulating full wellstream reservoir fluids. The fluids consisted of a stock tank oil sample, a synthetic blend of Green Canyon natural gas components and a synthetic 12 weight percent reservoir brine. The system was circulated while pressurized to 3,200 psig before the experiment. The percent of the brine volume to the total liquid volume (i.e., liquid hydrocarbon volume plus brine volume) was 48.7 volume percent. Anti-agglomerant (Baker Petrolite RE-4394) was added to the brine at the vendor-specified dose of 2.3 volume percent on water volume. The fluids were circulated and cooled to 42° F. in the flowloop. A pumpable hydrate slurry resulted.

Test 7. A fluid was introduced into a bench scale flowloop simulating full wellstream reservoir fluids. The fluids consisted of a stock tank oil sample, a synthetic blend of Green Canyon natural gas components and a synthetic 12 weight percent reservoir brine. The system was circulated while pressurized to 3,200 psig before the experiment. The percent of the brine volume to the total liquid volume (i.e., liquid hydrocarbon volume plus brine volume) was 50 volume percent. Anti-agglomerant (Baker Petrolite RE-4394) was added to the brine at the vendor-specified dose of 2.3 volume percent on water volume. The fluids were circulated and cooled to 42° F. in the flowloop. A non-pumpable hydrate slurry resulted and a hydrate plug formed.

Test 8. A fluid was introduced into a bench scale flowloop simulating full wellstream reservoir fluids. The fluids consisted of a stock tank oil sample, a synthetic blend of Green Canyon natural gas components and a synthetic seawater brine. The system was circulated while pressurized to 3,200 psig before the experiment. The percent of the brine volume to the total liquid volume (i.e., liquid hydrocarbon volume plus brine volume) was 65 volume percent. Anti-agglomerant (Baker Petrolite RE-4394) was added to the brine at the vendor-specified dose of 2.3 volume percent on water volume. The fluids were circulated and cooled to 40° F. in the flowloop. The resulting hydrates that formed were pumpable.

Test 9. A fluid was introduced into a bench scale flowloop simulating full wellstream reservoir fluids. The fluids consisted of a stock tank oil sample, a synthetic blend of Green Canyon natural gas components and a synthetic seawater brine. The system was circulated while pressurized to 7,649 psig before the experiment. The percent of the brine volume to the total liquid volume (i.e., liquid hydrocarbon volume plus brine volume) was 92 volume percent. Anti-agglomerant (Baker Petrolite RE-4394) was added to the brine at the vendor-specified dose of 2.3 volume percent on water volume. The fluids were circulated and cooled to 40° F. in the flowloop. The resulting hydrates that formed were pumpable.

water-cut and gas-water ratio combinations employed in tests 1, 2, 5, 6, 7, 8, and 9, respectively (see Table 1 for the precise values). This type of anti-agglomerant is effective in making a water-in-oil dispersion from 0-50 volume percent water-cut for the stock tank oil. Some hydrocarbons containing natural dispersants require less AA or no AA to achieve pumpable hydrate slurries. Most natural, liquid hydrocarbons require a dispersant to achieve this result. The area to the left of the vertical line 206 is the area where this anti-agglomerant achieves pumpable hydrate slurries. The area goes to infinite gas-water ratio. The area under the sloped line 208 represents conditions that lead to pumpable hydrate slurries with this AA and this hydrocarbon system. The area above the sloped line 208 represents conditions for which this AA and hydrocarbon system plugs when hydrates form. Tests 5-7 are off scale with respect to gas-water ratio in this figure. Tests 5 and 6 did not

TABLE 1

| Test No. | 1 | 2 | 3 | 4 | 5 | 6 | 7 | 8 | 9 |
|---|---|---|---|---|---|---|---|---|---|
| Initial Pressure, psig | 3,800 | 3,800 | 3,900 | 4,000 | 3,200 | 3,200 | 3,200 | 7,504 | 7,649 |
| Initial Temperature, ° F. | 100 | 100 | 100 | 99 | 100 | 100 | 100 | 107 | 106 |
| Final Hydrate Temperature, ° F. | 60 | 60 | 60 | 60 | 42 | 42 | 42 | 40 | 40 |
| Total Loop Volume, cc | 1,659 | 1,659 | 1,659 | 1,659 | 4,619 | 4,619 | 4,619 | 1,655* | 1,655* |
| Total Gas Volume, cc | 759 | 559 | 559 | 434 | 3,719 | 3,644 | 3,619 | 655 | 555 |
| Total Water Volume, cc | 810 | 1010 | 1010 | 1135 | 350 | 475 | 500 | 650 | 1010 |
| Total Oil Volume, cc | 90 | 90 | 90 | 90 | 550 | 500 | 500 | 350 | 90 |
| Water cut, % of total liquid volume | 90 | 91 | 92 | 92.7 | 38.9 | 48.7 | 50 | 65 | 92 |
| Gas-Water Ratio, SCF gas/bbl water | 1,373 | 846 | 846 | 584 | 12,990 | 9,572 | 8,267 | 2,889 | 1,606 |
| Water composition | Synthetic sea water (3.5 wt. % salt) | Synthetic sea water (3.5 wt. % salt) | Synthetic sea water (3.5 wt. % salt) | Synthetic sea water (3.5 wt. % salt) | Synthetic Sea Salt brine (12 wt. % salt) | Synthetic Sea Salt brine (12 wt. % salt) | Synthetic Sea Salt brine (12 wt. % salt) | Synthetic sea water (3.5 weight % salt) | Synthetic sea water (3.5 weight % salt) |
| Anti-agglomerant, Volume % | None | none | 1.5% Nalco VX-7539 | 1.5% Nalco VX-7539 | 2.3% Baker Petrolite RE-4394 | 2.3% Baker Petrolite RE-4394 | 2.3% Baker Petrolite RE-4394 | 2.3% Baker Petrolite RE-4394 | 2.3% Baker Petrolite RE-4394 |
| Pumpability | Non-pumpable | Non-pumpable | Non-pumpable | Pumpable | Pumpable | Pumpable | Non-pumpable | Pumpable | Pumpable |

*Tests 8 and 9 performed in pressure loop no. 2

Referring now to FIG. 1, a Hydrate Formation Curve 100 is presented having an ordinate 102 of pressure in pounds per square inch gauge (psig) and an abscissa 104 of temperature in degrees Fahrenheit (F). Reference numerals 1, 2, 3, 4, 5, 6, 7, 8; and 9 in FIG. 1 graphically represent the approximate temperature and pressure combinations employed in tests 1, 2, 3, 4, 5, 6, 7, 8, and 9, respectively (see Table 1 for the precise values). The solid curve 10 represents the hydrate curve for seawater salinity (3.54 weight percent salt). The dashed curve 11 represents the hydrate curve for a 12 weight percent salt brine. Tests 5-7 were tests of 12 weight percent brine. These tests correspond to the dashed hydrate curve. Tests 1-4 and 8-9 were tests with 3.54 weight percent brine (seawater). These tests correspond to the solid hydrate curve. All of these tests lie well within their respective hydrate curves. Also noteworthy, Tests 8 and 9 were run at 40° F. below the hydrate formation temperature for that pressure and composition. No known kinetic hydrate inhibitor is capable of holding a pipeline hydrate-free for several days at this degree of subcooling below the hydrate formation temperature. An anti-agglomerant can achieve this result.

Referring now to FIG. 2, a plot 200 relating gas-water ratio in standard cubic feet per barrel (scf/bbl) 202 for Baker Petrolite (RE-4394) and water cut by volume percent (%) 204 is shown along with data points from Table 1. Reference numerals 1, 2, 5, 6, 7, 8, and 9 graphically represent the approximate result in a hydrate plug. Test 7 did result in a hydrate plug because the water-cut was on the vertical line 206.

Figure 3:
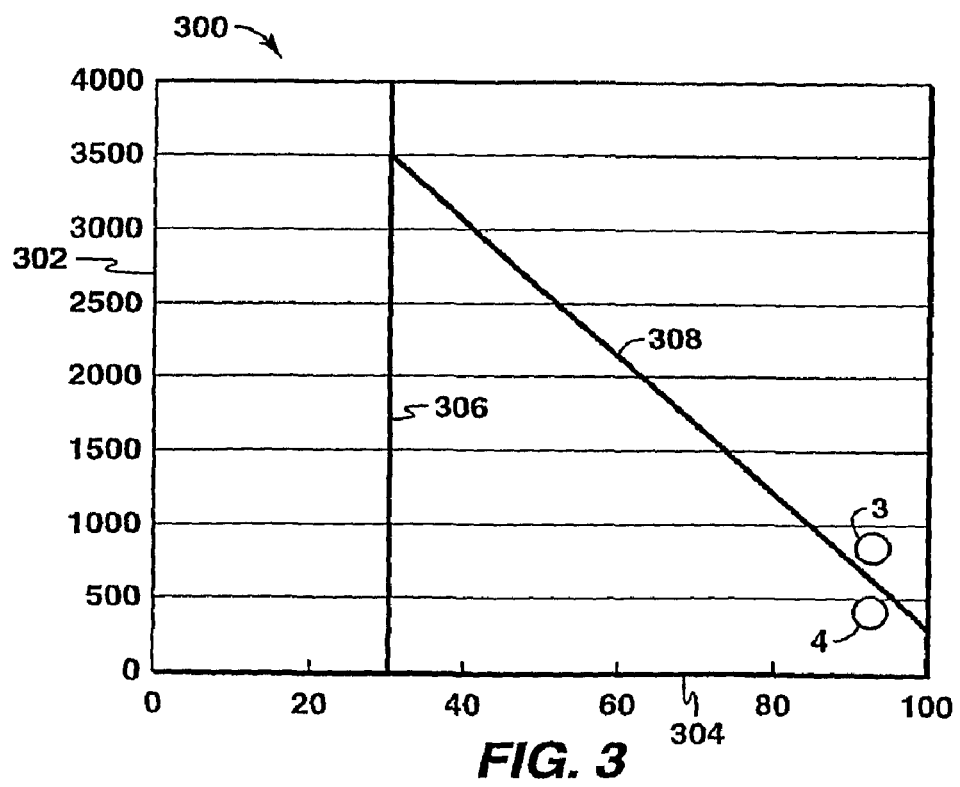
FIG. 3 is an illustration of an exemplary graph showing the preferred operating gas-water ratios for a simulated crude oil containing a second hydrate pumping enhancement anti-agglomerant additive.

Referring to FIG. 3, shows a plot 300 relating gas-water ratios for Nalco Anti-Agglomerant in standard cubic feet per barrel (scf/bbl) 302 and water cut by volume percent (%) 304 is shown along with data points from Table 1. Reference numerals 3 and 4 graphically represent the approximate water-cut and gas-water ratio combinations employed in tests 3 and 4, respectively (see Table 1 for the precise values). This type of anti-agglomerant is effective in making a water-in-oil dispersion from about 0-30 percent water-cut for the stock tank oil. Some hydrocarbons containing natural dispersants require less of this AA or no AA to achieve pumpable hydrate slurries. The area to the left of the vertical line 256 is the area where this anti-agglomerant achieves pumpable hydrate slurries. The area goes to infinite gas-water ratio. The area under the sloped line 308 represents conditions that lead to pumpable hydrate slurries with this AA and this hydrocarbon system. The area above the sloped line 308 represents conditions for which this AA and hydrocarbon system plugs when hydrates form. Other hydrocarbon systems may have a lower or higher sloped line than this system. This is most easily accomplished using a flowloop such as the one described in this application. Test 4 did not result in a hydrate plug. Test 3 did result in a hydrate plug because the gas-water ratio was above the sloped line 308.

While the present invention may be susceptible to various modifications and alternative forms, the exemplary embodiments discussed above have been shown only by way of example. However, it should again be understood that the invention is not intended to be limited to the particular embodiments disclosed herein. Indeed, the present invention includes all alternatives, modifications, and equivalents falling within the true spirit and scope of the appended claims.

What is claimed is:

1. A process for providing a pumpable hydrate slurry in a hydrocarbon fluid mixture having a water-cut greater than about 50 volume percent, said process comprising:
   treating the hydrocarbon fluid mixture with an anti-agglomerant;
   adding water to the hydrocarbon fluid mixture in an amount sufficient to lower the gas-water ratio sufficiently to achieve a pumpable hydrate slurry; and
   removing hydrate-forming gases from the hydrocarbon fluid mixture in an amount sufficient to provide a pumpable hydrate slurry.

2. The process of claim 1, wherein the water-cut of the hydrocarbon fluid mixture is greater than about 50 volume percent and less than about 92 volume percent water.

3. The process of claim 1, wherein the anti-agglomerant comprises at least one quaternary ammonium halide salt.

4. The process of claim 3, wherein the at least one quaternary ammonium halide salt includes tributyl octadecyl ammonium bromide.

5. The process of claim 3, wherein the at least one quaternary ammonium salt includes di-butyl di-octadecyl ammonium bromide.

6. The process of claim 1, wherein the hydrate gases are selected from the group consisting of methane, ethane and propane.

7. The process of claim 1, further comprising adding thermodynamic inhibitors of hydrate formation to the hydrocarbon fluid mixture.

8. The process of claim 7, wherein said thermodynamic inhibitors are selected from the group consisting of methanol and glycol.

9. The process of claim 1, wherein said anti-agglomerant is a chemical selected from the group consisting of diethanolamines, dioctylsulphosuccinates, sorbitans, ethoxylated polyols, ethoxylated fatty acids, ethoxylated amines, alkylarylsulfonates, alkylglucosides, tetrabutlyammonium bromide, tetrapentylammonium bromide, quaternary ammonium salts having two or more n-butyl, n-pentyl, and isopentyl groups with at least one or two groups consisting of a long hydrophobic hydrocarbon chain comprising 8-18 carbon atoms, diesters of dibutyldiethanolammonium halides and two moles of coconut fatty acids with 12-14 carbon atoms, bis (coco alkyl) dibutyl ammonium chloride, bis(coco alkyl) dipentyl ammonium chloride, bis(coco alkyl) di butyl ammonium bromide, bis(coco alkyl) dipentyl ammonium bromide, and mixtures thereof.

10. The process of claim 1, further comprising the steps of:
    prior to the treating step, extracting a hydrocarbon fluid mixture comprising hydrate-forming gases from a wellbore, said hydrocarbon fluid mixture having at least an oil phase and a water phase;
    wherein the anti-agglomerant is added to the water phase; and
    after the removing step, transporting said hydrocarbon fluid mixture through a pipeline to a remote location for loading or further processing.

11. The method according to claim 10 wherein said hydrocarbon fluid mixture is crude oil.

12. The method according to claim 10 wherein said hydrocarbon fluid mixture a light crude oil having greater than about 20° API.

13. The process or method according to claim 1 or 10, wherein said anti-agglomerant is a water soluble anti-agglomerant.

* * * * *